Patented Mar. 6, 1923.

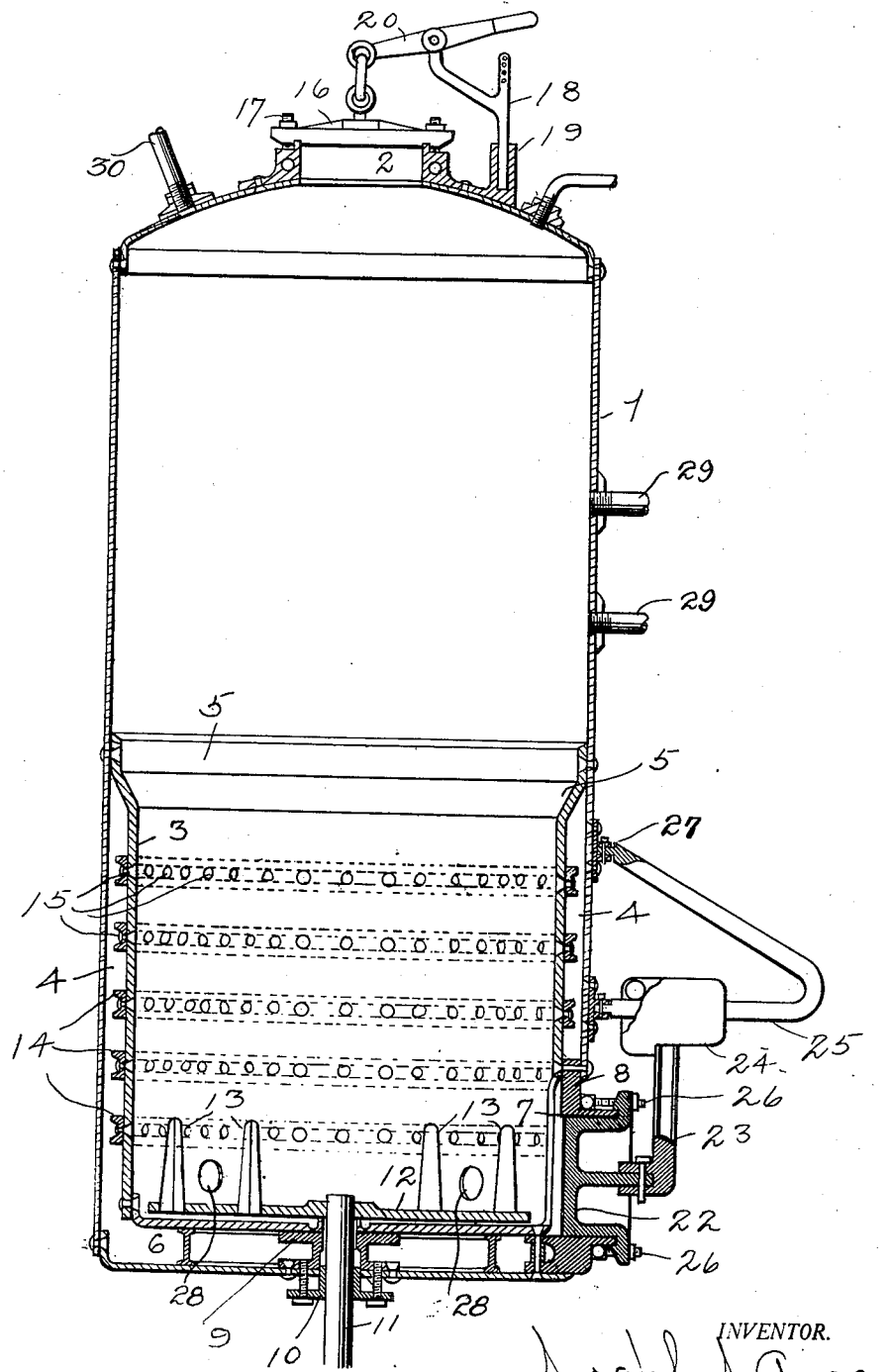

1,447,205

UNITED STATES PATENT OFFICE.

JOSEPH J. GAGE, OF DAYTON, OHIO, ASSIGNOR, BY MESNE ASSIGNMENTS, OF ONE-HALF TO THOMAS CURETON, OF DAYTON, OHIO.

DRIER TANK.

Application filed December 18, 1920. Serial No. 431,679.

*To all whom it may concern:*

Be it known that I, JOSEPH J. GAGE, a citizen of the United States, residing at Dayton, in the county of Montgomery and State of Ohio, have invented certain new and useful Improvements in Drier Tanks, of which the following is a specification.

My invention relates to cooker tanks for butchers and packers, and more particularly to reinforcement means for the inner shell of steam jacketed tanks, used for cooking and drying refuse, offals, and waste material for fertilizer purposes, but also capable of use as a rendering tank.

The object of the invention is to simplify the structure as well as the means and mode of operation of such tanks, whereby they will not only be cheapened in construction, but will be more efficient in use, have greater durability, of increased strength, and subjected to minimum stresses and strains, incident to expansion and contraction.

A further object of my invention is to so construct and arrange the parts of such cooker tank as to obviate the necessity of stay bolts, spacers or other reinforcing means connecting the inner and outer shells of the cooker tanks, to prevent the collapse of the inner compartment.

A further object of the invention is to provide a reinforced inner shell or compartment, which will be free to expand with variations of temperature independent of the outer shell, yet amply reinforced to resist collapsing tendencies under external pressure.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, which comprise a vertical sectional view of an assembled cooker tank embodying the present invention, there is illustrated the preferred, but not necessarily the only embodiment, of such invention.

In the reduction of refuse and offals, for fertilizer purposes, it is quite the practice to cook such material in a steam jacketed or double boiler, by first introducing the live steam directly into the mass of material, until it is thoroughly cooked, and all grease, fat and oil are liberated. The grease and oil which rises to the top of the cooking mass are drained off thru outlet conduits, and after the mass has been sufficiently cooked, steam is admitted to the intermediate space between the walls of the vessel or boiler, thereby subjecting the cooked mass of material to a drying heat. The mass is continuously agitated during the drying process, by a rotary agitator within the inner vessel or compartment. Heretofore considerable difficulty has been experienced thru the tendency of the inner vessel or compartment to collapse under external pressure of the steam within the steam jacket or space between the walls of the inner and outer compartment. It has been customary to provide stay bolts or ties which connect the inner and outer compartments or shells at intervals. However, the inner shell being subject to much greater heat and not subjected to the cooling influence of the surrounding atmosphere, expands and contracts to a greater degree than the exterior shell, thereby setting up stresses and strains, which tend to loosen the stay bolts or ties, thereby causing leakage. Moreover, these strains and stresses tend to warp the walls of the compartments or shells ununiformly, materially shortening the life and durability of such cookers.

The mass of material comprising offals, refuse and waste material to be treated is of more or less acid nature and upon the loosening of the stay bolts in the ordinary construction, this acid attacks the material of the stay bolts and the interengaging screw threads, causing rust and corrosion and materially increasing the looseness and leakage, initiated by the ununiform warping and the strains of the vessel due to expansion and contraction.

Referring to the drawing, 1 is a cylindrical shell or boiler having at the upper end a man hole or access opening 2. Within this main outer shell 1, is suspended an inner shell or cooking vessel 3. Such inner shell 3 is of less diameter than the main shell 1, and is positioned concentrically therein in spaced relation with the walls of the main shell 1 to afford intermediate the inner shell 3 and outer shell 1, a surrounding steam space 4. The inner cooking shell 3 is attached to the walls of the shell 1 at a substantially mid height point by being outwardly flanged or expanded, as at 5 and secured by riveting, welding or other suitable means. The connection is at such points that the inner or cooking shell is suspended within the main shell in spaced relation not only with the side walls, but also with the bottom of such main shell, as indicated at 6. At the lower portion of the inner or cooking shell 3 there is provided a man hole 7 formed in a collar or spacer 8, interposed between the inner and outer shells, and sealing the space about such man hole. Centrally disposed in the bottom of cooker is a head 9, having therein a packing gland 10, thru which extends the revoluble shaft 11 of an agitator rotatable within the cooking tank 3. This agitator comprises radially disposed arms 12 preferably having upturned extensions 13. Aside from the connection of the man hole collar 8 and the bearing head 9 for the agitator shaft, the inner shell 3 is entirely independent of the outer shell 1, below its upper marginal attachment flange. No intermediate ties are interposed between the walls of the inner and outer shell. In lieu thereof, the inner shell is provided with annular hoops, which surround the inner shell at spaced intervals and have positive engagement therewith. In the drawings this engagement has been shown as comprising a series of rivets 15. It will be understood, however, that in lieu of riveting these hoops, they may be welded or otherwise attached. These hoops, whether of channel shape or other form reinforce the walls of the inner shell or compartment 3, enabling such walls to resist the external pressure of the steam within the intervening space between the shell 3 and main shell 1, while at the same time permitting the walls of the shell to expand and contract independent of the main shell 1, without subjecting either of the shells to undue strain incident to the tying or interconnection of the respective shells by tie bolts or other spacer means.

The manhole 2 at the top of the cooker is provided with a closure lid 16 to be secured in position by bolts 17. In order to lift the closure head 16 into and out of registry with the man hole, there is provided a Y-shaped standard revolubly mounted in a socket 19. The closure head 16 is suspended from a lifting lever 20 pivoted to one of the arms of the Y-shaped standard 18. The lifting lever is engageable with the other arm of such Y-shaped standard to maintain the closure head 16 in elevated position.

The man hole 7 at the bottom of the cooker is likewise provided with a removable closure head 22. This closure head is carried upon the end of a dependent arm 23, mounted upon a slide 24, having reciprocatory movement upon a swinging bracket arm 25, hinged to the shell 1. This closure head 22 is likewise secured in adjusted position by swinging bolts 26. Upon releasing the nuts upon the bolts 26 and swinging such bolts aside, the closure head 22 may be withdrawn from the man hole 7, by sliding the support 24 outwardly upon the bracket arm 25, whereupon the bracket arm may be oscillated laterally upon its hinged connection 27, to shift the closure head 22 out of registry with man hole 7. For convenience, the closure head 22 is preferably hinged or pivoted to the lower end of the dependent supporting arm 23.

A steam inlet 28 is provided adjacent to the bottom of the inner shell thru which steam is admitted during the cooking process. Likewise outlets 29 are provided at different levels thru which may be drawn off the grease and oil released from the mass of material during the cooking operation. In the top of the shell 1 is provided an exhaust conduit 30, connected to a suitable suction apparatus, by which the vapors are exhausted from the shell during the drying operation, which is effected by the circulation of steam intermediate the inner and outer shells, after the cooking operation has been completed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. In a cooker tank of the character described, the combination with inner and outer cylindrical shells mounted in spaced relation to afford a steam space intermediate the walls thereof, and a series of channel iron rings engaging the walls of the inner shell, but independent of the outer shell to reinforce the inner shell against external pressure.

2. In a cooker tank of the character described, a vessel having in its top a man hole, a removable closure for the man hole, a standard revolubly supported adjacent to the man hole, a lifting lever pivoted to said standard and operatively connected with the closure, and means by which the lever may be engaged with the standard in its operated position with the closure elevated off the man hole.

3. In a cooker tank of the character described, a vessel having in the side thereof a man hole, a removable closure therefor, a swinging bracket arm adjacent to the man hole, and a supporting arm for the closure slidingly mounted upon the swinging bracket arm.

In testimony whereof, I have hereunto set my hand this 4th day of December A. D. 1920.

JOSEPH J. GAGE.

Witnesses:
GEORGE C. HELMIG,
HANNAH M. CLINE.